UNITED STATES PATENT OFFICE 2,157,004

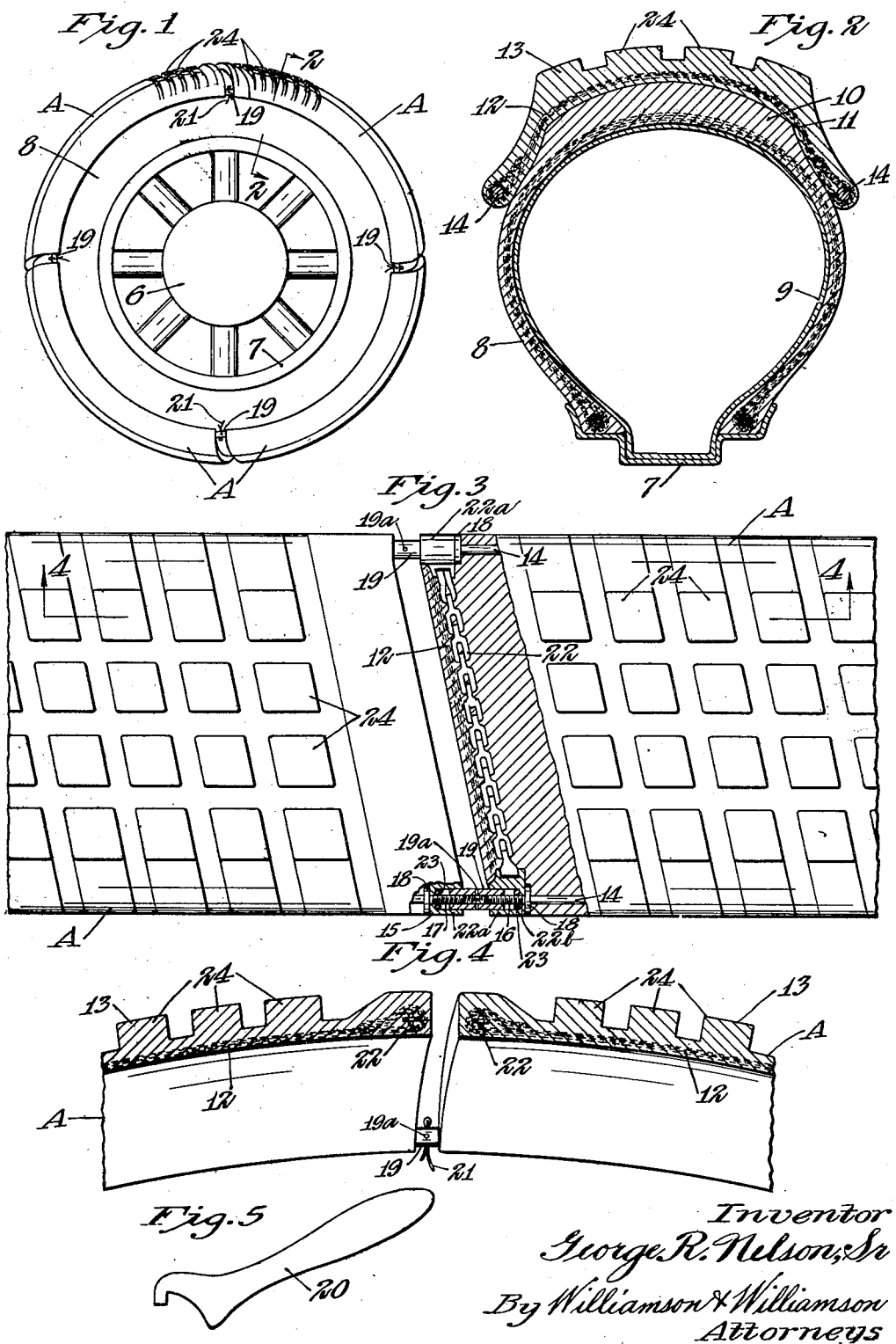

DETACHABLE TIRE TREAD

George R. Nelson, Sr., Almelund, Minn.

Application January 21, 1938, Serial No. 186,120

6 Claims. (Cl. 152—189)

This invention relates to detachable tire treads for use on vehicle tires.

It is the general object of the invention to provide a novel and improved detachable tire tread which can be easily applied to and detached from vehicle tire casings for furnishing a new tread surface for worn tires or for furnishing traction means for any type of tires, in place of chains or the like.

The objects and advantages of the invention will more fully appear from the following description, made in connection with the accompanying drawing, in which like reference characters refer to the same or similar parts throughout the various views, and in which—

Fig. 1 is a view in side elevation of a tire equipped automobile wheel to which the detachable tire tread of the present invention has been applied;

Fig. 2 is a vertical section taken on the line 2—2 of Fig. 1, as indicated by the arrows;

Fig. 3 is a plan view looking down on portions of two of the tread sections, certain parts being broken away and shown in section;

Fig. 4 is a vertical section taken substantially on the line 4—4 of Fig. 3, as indicated by the arrows, and Fig. 5 is a view in side elevation of a wrench that may be employed for operating the turnbuckles.

Referring to the drawing an automobile wheel 6 is illustrated to which a drop center rim 7 is applied. Mounted on the rim 7 is an automobile tire including a tire casing 8 and an inner tube 9 of standard construction. The tire casing 8 is shown as having a tread portion 10 which forms shoulders 11 with the sides of the casing. The tread portion 10 may be considered either worn or not worn.

In accordance with the present invention, I provide a plurality of tread sections, each of which is designated as an entirety by the letter A. These tread sections are composed for the most part of rubber having cords 12 embedded therein as is usual in automotive tire construction and this corded rubber forms the body 13 of each tread section. Each tread section, as viewed in plan, is of substantially parallelogram-shape, the two ends of the section being set diagonally relative to the side edges of the section. As viewed in cross section, each tread section is roughly of C-shape to properly fit over a portion of the tire casing 8 in connection with which the sections are to be used. Preferably the inner surface of each section will be shaped to properly take the shoulders 11 of the casing 8.

The edges of each section are preferably beaded and they carry embedded therein longitudinal metallic reinforcing elements 14. These metallic reinforcing elements 14 in the form shown are resilient solid rods but, if desired, they may be steel cables. Notches 15 are cut at the corners of the tread sections A and the opposite ends of each longitudinal reinforcing element 14 are screw threaded to form studs 16 and 17 respectively projecting across the notches 15. The studs 16 and 17 are similar except for the fact that the two studs are oppositely threaded, for example, the studs 16 have right handed screw threads formed thereon and the studs 17 have left handed screw threads formed thereon. At the points where studs 16 and 17 terminate, disk-like flanges 18 are formed on the reinforcing elements 14, these flanges fitting within the notches 15 and bearing against the body 13.

To connect adjacent tread sections A together and to draw up the tread sections tightly on a tire casing 8, turnbuckles 19 are employed. Each turnbuckle 19 takes a stud 16 of one section A and a stud 17 of the next adjacent section. The turnbuckles have cross openings 19a therein to take a wrench 20 which can be employed for tightening the turnbuckles. To keep the turnbuckles 19 from loosening, after the detachable tire tread has been applied to a tire casing 8, cotter keys 21 may be employed, these cotter keys passing through certain of the holes 19a so that portions of the keys will bear against the sides of the tire casing 8.

The ends of each tread section A are beaded and embedded in each beaded end are metallic cross reinforcement elements 22, these cross reinforcing elements being chains in the illustrated embodiment. The outermost links 22a of these chains 22 have rather wide sleeves through which the respective studs 16 and 17 extend and which receive end portions of the turnbuckles 19. To prevent shifting of the links 22a relative to the studs 16 and 17, the inner ends of the links 22a are provided with shoulders 22b and nuts 23 threaded on the studs 16 and 17 and received within the links 22a are drawn up tightly against shoulders 22b. Preferably the cords 12 of each tread section A are looped around both the longitudinal reinforcing elements 14 and the cross reinforcing elements 22 as illustrated in Figs. 2 and 4.

The exterior surface of each tread section 13 may be finished in any suitable tread design to secure proper traction. In the particular embodiment shown traction studs 24 are formed on the exterior surface of each tread section and these studs are arranged in rows extending diagonally across each tread section. By making the tread sections in rights and lefts, and employing the diagonal rows of studs 24, when the proper tread sections are assembled on opposite wheels of an automobile and power is applied to the wheels side slippage of the wheels in a direction away from the automobile can be minimized.

In Fig. 1 of the drawing, to save needless duplication the studs 24 are shown on but certain portions of two sections A. It will be understood, however, that these studs will be found on all portions of the exterior surfaces of all sections A.

When the proper number of tread sections A are assembled together on a tire casing 8, they form an annular cover for the tire casing which when the turnbuckles 19 have been properly drawn up, tightly clinch onto the casing so that relative movement between the tread sections and the casing can not take place. The ends of the tread sections are purposely diagonally cut so that during rotation of the wheel, at least portions of one or more tread sections are always in contact with the road surface. This prevents a jar or bump in advancing from one tread section to another, as the wheel turns. In other words, a transverse line taken through the entire tire tread device at any point will cut at least one of the tread sections A.

The longitudinal reinforcement members 14 of the various tread sections interconnected by the studs 16 and 17 and the turnbuckles 19 form in reality metallic hoops which strengthen the entire device and hold the same properly on the tire casing 8. These hoops are, in turn, cross braced at intervals by means of the cross reinforcement elements or chains 22. A metal skeleton is thus provided to which the corded rubber bodies 13 are securely fastened.

It will be seen that a simple and efficient tire tread device has been provided which can be quickly and easily applied to and detached from a tire casing. The turnbuckles 19 provide for effective adjustment of the size of the device to compensate for wear of the tire casing and for small differences in size between different casings.

It will, of course, be understood that various changes may be made in the form, details, arrangement and proportions of the various parts without departure from the scope of the present invention, which, generally stated, consists in the matter shown and described and set forth in the appended claims.

What is claimed is:

1. A detachable tire tread, comprising a plurality of sections composed chiefly of rubber and adapted to overlie the tread surface of a tire casing, means interconnecting the ends of said sections, the ends of said sections being beaded, cross chains embedded in said beaded ends and means for anchoring the ends of said cross chains at the edges of said sections.

2. A detachable tire tread, comprising a plurality of tread sections composed chiefly of rubber and overlying the tread of a tire casing, metallic members embedded in the edges of said sections and extending throughout the length thereof, means interconnecting the adjacent metallic members of adjacent sections and cross metallic members embedded in the ends of said sections and having connection with said first mentioned metallic members of the respective sections.

3. A detachable tire tread comprising a plurality of tread sections composed principally of rubber and adapted to overlie a tire casing in adjacent circumferentially spaced relation, said sections being of substantially parallelogram-shape in plan view, longitudinal reinforcement elements of metal embedded in the edges of said sections, said longitudinal elements having attachment portions projecting from the ends of said sections and cross chains embedded in the ends of said sections and having connections at their ends with said longitudinal elements.

4. A detachable tire tread comprising a plurality of tread sections composed principally of rubber and adapted to overlie a tire casing in adjacent circumferentially spaced relation, said sections being of substantially parallelogram-shape in plan view, longitudinal reinforcement elements of metal embedded in the edges of said sections, said elements having screw threaded portions at their ends, transverse reinforcement elements of metal embedded in the end portions of said sections and having sleeves at their ends through which the screw threaded portions of said longitudinal reinforcement elements extend and turnbuckles connecting the screw threaded portions of adjacent elements and partially received within said sleeves.

5. A detachable tire tread comprising a plurality of tread sections composed principally of rubber and adapted to overlie a tire casing in adjacent circumferentially spaced relation, said sections being of substantially parallelogram-shaped in plan view, longitudinal reinforcement elements of metal embedded in the edges of said sections, said sections having notches at their corners and said longitudinal reinforcement elements having stud portions projecting in said notches and turnbuckles partially received within said notches and having connection with said stud portions, said stud portions having shoulders bearing against the ends of said tread sections.

6. A detachable tire tread comprising a plurality of tread sections composed principally of rubber and adapted to overlie a tire casing in adjacent circumferentially spaced relation, said sections being of substantially parallelogram-shaped in plan view, longitudinal reinforcement elements of metal embedded in the edges of said sections, said sections having notches at their corners and said longitudinal reinforcement elements having stud portions projecting into said notches, turnbuckles partially received within said notches and having connection with said stud portions and metal cross reinforcement elements embedded in the end portions of said tread sections and having eyes through which said stud portions project.

GEORGE R. NELSON, Sr.